Jan. 6, 1953  B. F. GREIMAN  2,624,259
CULTIVATOR SHIELD OR FENDER
Filed Nov. 30, 1948  2 SHEETS—SHEET 1
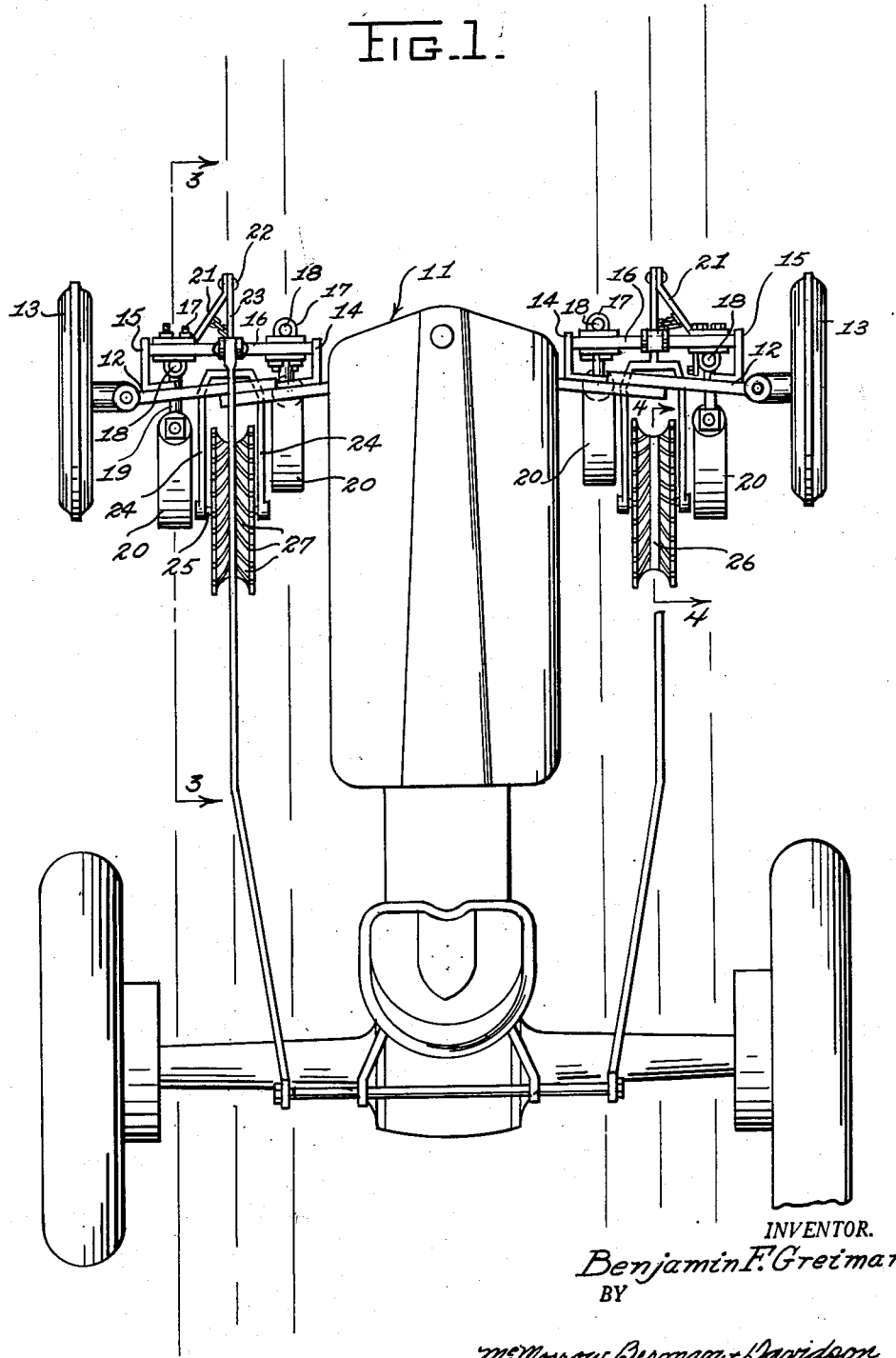
INVENTOR.
Benjamin F. Greiman
BY
McMorrow, Berman + Davidson
ATTORNEYS Jan. 6, 1953     B. F. GREIMAN     2,624,259
CULTIVATOR SHIELD OR FENDER
Filed Nov. 30, 1948     2 SHEETS—SHEET 2
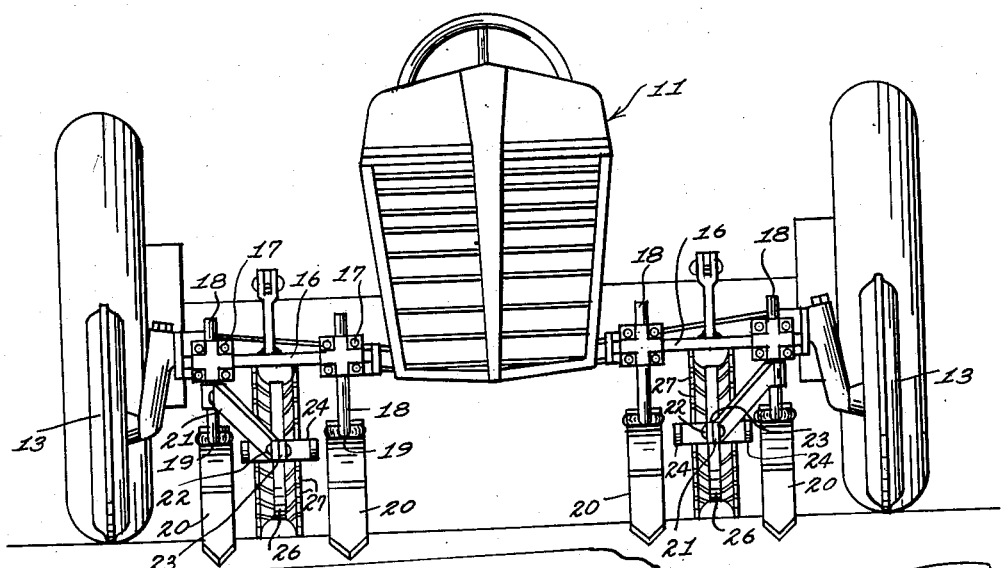
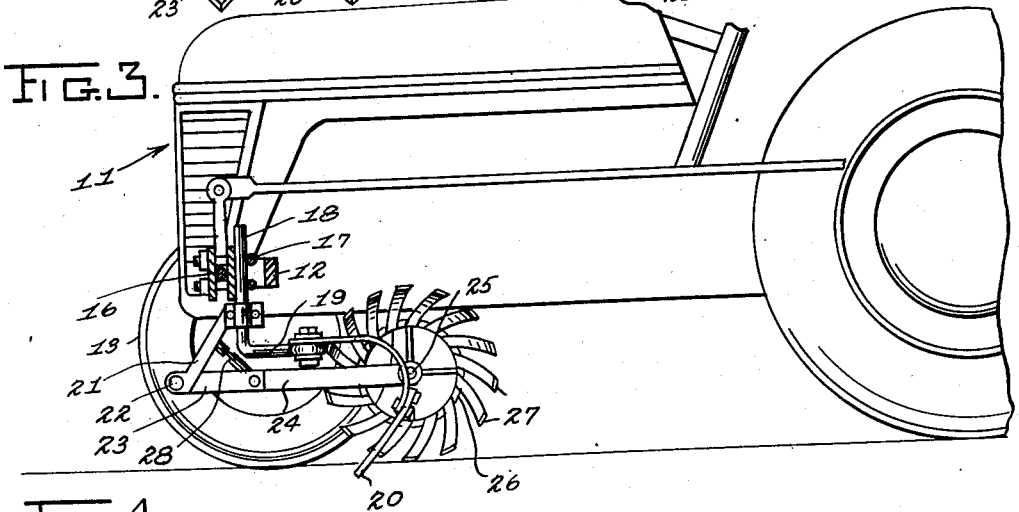
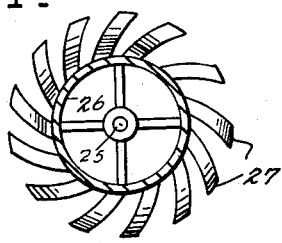
INVENTOR.
Benjamin F. Greiman
BY
McMorris, Berman & Davidson
ATTORNEYS Patented Jan. 6, 1953

2,624,259

UNITED STATES PATENT OFFICE 2,624,259

CULTIVATOR SHIELD OR FENDER

Benjamin F. Greiman, Garner, Iowa

Application November 30, 1948, Serial No. 62,623

5 Claims. (Cl. 97—188)

This invention relates to cultivating machines, and more particularly to shields for protecting small plants against injury by large clods of soil during the cultivation of row crops by a machine of the tractor drawn type.

A main object of the invention is to provide a novel and improved rotary fender attachment for cultivating machines which protects small row crops against injury from large clods and lumps of soil but allows pulverized soil to reach the small plants, said attachment being very simple in construction, easy to instal and substantially automatic in operation.

A further object of the invention is to provide an improved rotary fender or guard attachment for cultivating machines which is inexpensive to fabricate, sturdy in construction and which is self-cleaning during operation, whereby it requires only a small amount of attention to maintain it in operating condition.

Further objects and advantages of the invention will become apparent from the following description and claims, and from the accompanying drawings, wherein:

Figure 1 is a top plan view, partly in horizontal cross-section, of a row crop cultivating machine provided with fender attachments in accordance with the present invention.

Figure 2 is a front elevational view of the cultivating machine of Figure 1.

Figure 3 is a longitudinal cross-sectional view taken on line 3—3 of Figure 1.

Figure 4 is an enlarged cross-sectional detail view taken on line 4—4 of Figure 1.

Referring to the drawings, 11 designates a conventional farm tractor having the frame portions 12, 12 on which are mounted the front wheels 13, 13 of the tractor. Secured to the frame portions 12, 12 by respective pairs of angle brackets 14, 15 are transverse bar members 16, 16, rotatively mounted in the forwardly projecting flange of the angle brackets. Clamped to each bar member 16 by U-bolts 17, 17 are the spaced plow standards 18, 18, each of said standards 18 having a rearwardly bent lower portion 19 to which is secured a cultivating blade 20. As shown in Figure 1, there are two cultivating blades 20, 20 on each side of the tractor, spaced apart so as to cultivate on both sides of a row of crops as the tractor proceeds forwardly over the rows. The structure thus far described is conventional and forms no part of the present invention.

Secured to the outer standard 18 of each pair, below the bar member 16, is a downwardly, forwardly, and inwardly inclined bracket bar 21 which extends to the median longitudinal plane between the associated plow blades 20, 20. Pivotally connected at 22 to the end of each bracket 21, for pivotal movement in a vertical plane, is a rearwardly extending bar 23 provided with spaced rearwardly directed yoke arms 24, 24. Journalled in the ends of each pair of yoke arms 24, 24 is a transverse shaft 25. Secured to the midportion of each shaft 25 is a fender wheel member 26. As shown in Figures 1 and 3 the shafts 25 of the fender wheel are located substantially in transverse alignment with the outer blades 20, so that the wheels 26 extend in front of and behind the pairs of blades.

Secured to the periphery of each wheel member 26 as by welding, are the spaced arcuate teeth 27, said teeth extending from opposite sides of the wheel periphery and being arcuately curved outwardly from the plane of the wheel to define a concave outwardly facing annular cavity around the wheel periphery. The teeth 27 are also arcuately curved spirally with respect to the wheel, as shown in Figure 4, in the direction opposite to the direction of rotation of the fender wheels 26.

Each bar 23 is supported from its associated bracket 21 by a chain 28 so that downward angling of the bar 23 and the fender wheel carried thereby is limited by said chain, although there is no limitation on upward movement of the fender wheel with respect to bracket 21.

The tractor may be provided with conventional means for lifting the plow supporting bars 16 and the cultivator blades 20 carried thereby to inoperative positions. Since the brackets 21 are secured to the outer plow standards 18, the fender wheels will also be lifted to inoperative positions along with the cultivator blades.

In operation, the fender wheels ride over the small plants in the rows between the cultivator blades 20 as the machine proceeds forwardly over the rows, the plants being covered by the protective concave annular outer cavities defined by the spaced arcuately curved spiral teeth 27. Large clods and lumps of soil dislodged by the cultivator blades and thrown inwardly thereby cannot injure said small plants since the plants are covered by the fender wheels. Finely pulverized soil, however, is allowed to reach the plants because of the spaces provided between the fender teeth 27.

The teeth 27 engage the soil adjacent the plants and cause the fender wheels to rotate as the machine proceeds forwardly, since the wheels are biased downwardly by gravity. This provides an additional cultivating action closely adjacent the plants but at a depth merely sufficient to break up the thin crust adjacent the plant stalks, yet not sufficient to injure the plant roots.

The degree of the auxiliary cultivating action provided by the toothed fender wheels may be regulated by adjusting the length of the chains 28.

While a specific embodiment of a rotary shield attachment for cultivating machines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an attachment for a row cultivator having a transverse frame member, a horizontal transverse bar adapted to be mounted on said member for rotation on the axis of said bar, a pair of laterally spaced cultivator elements fixed on said bar, said cultivator elements extending rearwardly from said bar and terminating at their rear ends in downwardly directed blades, a bracket bar fixed to one of said cultivator elements and extending forwardly and downwardly from said transverse bar, a yoke having rearwardly extending laterally spaced arms, said yoke being pivoted at its forward end on the depressed forward end of said bracket bar, and a transverse axis fender wheel mounted between said yoke arms.

2. In a row cultivator device, a horizontal bar adapted to be mounted on a cultivator frame to extend horizontally in a direction across the path of travel of the cultivator, a pair of laterally spaced cultivator elements having forward ends fixed to said bar and having rear ends having downturned blades, the downturned blade of one of said cultivator elements being spaced rearwardly from the downturned blade of the other cultivator element, a bracket bar fixedly mounted on one of said cultivator elements, said bracket bar depending from said horizontal bar and having a lower end positioned between said cultivator elements, a yoke positioned between said cultivator elements and having a forward end portion pivoted on a horizontal axis to the said lower end of the bracket bar, and fender wheels positioned between said cultivator elements and mounted on a rear end portion of said yoke with the axis of the fender wheels positioned rearwardly of the downturned blade of one of the cultivator elements and in transverse alignment with the downturned blade of the other cultivator element.

3. In a cultivator device, a horizontal bar adapted to be mounted on a cultivator frame to extend horizontally across the path of travel of the cultivator, two laterally spaced cultivator elements comprising standards secured to and depending from said horizontal bar at points spaced along said horizontal bar, rearwardly extending portions on the lower ends of said standards, downturned blades secured to and depending from said rearwardly extending portions, a bracket bar having a rear end fixedly mounted on the standards of one of said cultivator elements and a forward end located forwardly of the horizontal bar in the space between the cultivator elements and on a level below said horizontal bar, a rearwardly extending yoke located in the space between the cultivator elements, said yoke having a forward end pivoted on a horizontal axis to the said lower end of the bracket bar and a rear end, and a fender wheel mounted on the rear end of the yoke and positioned between the downturned blades of the cultivator elements.

4. In a cultivator device, a fender wheel comprising a wheel member adapted to be axially and rotatably mounted on an axle, teeth fixed on said wheel member at opposite ends of and at equally circumferentially spaced points of said wheel member, said teeth having inner ends secured to the wheel member and free outer ends, the teeth arranged in axially spaced rows on said wheel member, the teeth of the two rows being curved away from each other in opposite directions.

5. In a cultivator device, a fender wheel comprising a wheel member adapted to be axially and rotatably mounted on an axle, teeth fixed on said wheel member at opposite ends of and at equally circumferentially spaced points of said wheel member, said teeth having inner ends secured to the wheel member and free outer ends, the teeth arranged in axially spaced rows on said wheel member, the teeth of the two rows being curved away from each other in opposite directions, the teeth in each row being pivotly curved in a direction opposite to the direction of rotation of the fender wheel.

BENJAMIN F. GREIMAN.

REFERENCES CITED

The following references are of record in the file of this patent:

UNITED STATES PATENTS

| Number | Name | Date |
|---|---|---|
| 231,582 | Ives | Aug. 24, 1880 |
| 622,162 | Pattisson | Mar. 28, 1899 |
| 626,222 | Cornell | June 6, 1899 |
| 835,664 | Connell | Nov. 13, 1906 |
| 979,264 | Darden | Dec. 20, 1910 |
| 1,003,029 | Brigden | Sept. 12, 1911 |
| 1,349,419 | Garst | Aug. 10, 1920 |
| 1,357,092 | Humphrey | Oct. 26, 1920 |